United States Patent
Fiumano et al.

(10) Patent No.: US 10,595,258 B2
(45) Date of Patent: Mar. 17, 2020

(54) WIRELESS COMMUNICATION CONTROL BASED ON BORDER GATEWAY PROTOCOL

(71) Applicant: Sprint Communications Company L.P., Overland Park, KS (US)

(72) Inventors: Michael Francis Fiumano, McLean, VA (US); Charles Andrew Robertson, II, Shawnee, KS (US); Byron J. Hoskins, Kansas City, MO (US); Joseph E. Gaudutis, Lee's Summit, MO (US)

(73) Assignee: Sprint Communications Company L.P., Overland Park, KS (US)

(*) Notice: Subject to any disclaimer, the term of this patent is extended or adjusted under 35 U.S.C. 154(b) by 0 days.

(21) Appl. No.: 16/107,907

(22) Filed: Aug. 21, 2018

(65) Prior Publication Data
US 2019/0007885 A1 Jan. 3, 2019

Related U.S. Application Data

(63) Continuation of application No. 14/323,698, filed on Jul. 3, 2014, now Pat. No. 10,085,196.

(51) Int. Cl.
*H04W 36/30* (2009.01)
*H04L 12/751* (2013.01)
*H04W 28/02* (2009.01)
*H04W 36/00* (2009.01)

(52) U.S. Cl.
CPC ............. *H04W 36/30* (2013.01); *H04L 45/02* (2013.01); *H04W 28/02* (2013.01); *H04W 36/0022* (2013.01)

(58) Field of Classification Search
None
See application file for complete search history.

(56) References Cited

U.S. PATENT DOCUMENTS

| | | | |
|---|---|---|---|
| 8,264,956 B2 | 9/2012 | Ramankutty et al. | |
| 2010/0132039 A1* | 5/2010 | Ji | H04L 63/1408 726/23 |

(Continued)

FOREIGN PATENT DOCUMENTS

EP 2693806 A2 2/2014

*Primary Examiner* — Frantz Bataille

(57) ABSTRACT

In a wireless communication network, base stations exchange user data for a communication service between User Equipment (UE) and wireless network gateways. The network gateways exchange the user data with Internet Protocol (IP) routers. One of the gateways receives a Border Control Protocol (BGP) message from one of the IP routers indicating a performance issue with an IP address. The network gateway associates the IP address with the communication service and transfers signaling indicating a service issue. A management computer receives the signaling and transfers signaling to the base stations to shed the one gateway for the communication service. The base stations then exchange the user data for the communication service between the UEs and the wireless network gateways except for the one gateway. These other gateways exchange the user data for the communication service with the IP routers except for the IP router having the issue.

14 Claims, 8 Drawing Sheets

(56) References Cited

U.S. PATENT DOCUMENTS

| | | | |
|---|---|---|---|
| 2010/0144314 A1* | 6/2010 | Sherkin | G06F 21/33 |
| | | | 455/411 |
| 2011/0235505 A1 | 9/2011 | Eswara et al. | |
| 2012/0063300 A1* | 3/2012 | Sahin | H04W 36/12 |
| | | | 370/225 |
| 2012/0270545 A1 | 10/2012 | Zhao et al. | |
| 2012/0307631 A1 | 12/2012 | Yang et al. | |
| 2013/0060962 A1 | 3/2013 | Wang et al. | |
| 2013/0117449 A1 | 5/2013 | Hares et al. | |
| 2013/0336118 A1 | 12/2013 | Shaw et al. | |
| 2014/0024383 A1 | 1/2014 | Rahman et al. | |
| 2014/0078890 A1* | 3/2014 | Lu | H04W 24/04 |
| | | | 370/221 |
| 2014/0078952 A1 | 3/2014 | Bontu et al. | |
| 2014/0099966 A1 | 4/2014 | Hori et al. | |

* cited by examiner

WIRELESS COMMUNICATION CONTROL BASED ON BORDER GATEWAY PROTOCOL

RELATED CASES

This United States Patent Application is a continuation of U.S. patent application Ser. No. 14/323,698 that was filed on Jul. 3, 2014 and is entitled, "WIRELESS COMMUNICATION CONTROL BASED ON BORDER GATEWAY PROTOCOL." U.S. patent application Ser. No. 14/323,698 is hereby incorporated by reference into this United States Patent Application.

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, Internet Protocol (IP) may be used to transfer communications across the various gateway and routing nodes. To assist with the IP communications, Border Gateway Protocol (BGP) may be used between the various routing and gateway nodes as a standardized exterior gateway protocol. BGP is designed to exchange routing and reachability information between autonomous systems on IP networks. Accordingly, BGP may indicate reachable IP addresses for connecting nodes and inform the nodes of any IP addresses that are no longer available. However, BGP is used to provide IP reachability information and is not based on providing information for controlling wireless communication device traffic.

Overview

In a wireless communication network, wireless base stations exchange user data for a communication service between User Equipment (UE) and wireless network gateways. The network gateways exchange the user data with Internet Protocol (IP) routers. One of the gateways receives a Border Control Protocol (BGP) message from one of the IP routers indicating a performance issue with an IP address. The network gateway associates the IP address with the communication service and transfers signaling indicating a service issue. A management computer receives the signaling and transfers signaling to the base stations to shed the one gateway for the communication service. The base stations then exchange the user data for the communication service between the UEs and the wireless network gateways except for the one gateway. These other gateways exchange the user data for the communication service with the IP routers except for the IP router having the performance issue.

DETAILED DESCRIPTION

Figure 1:
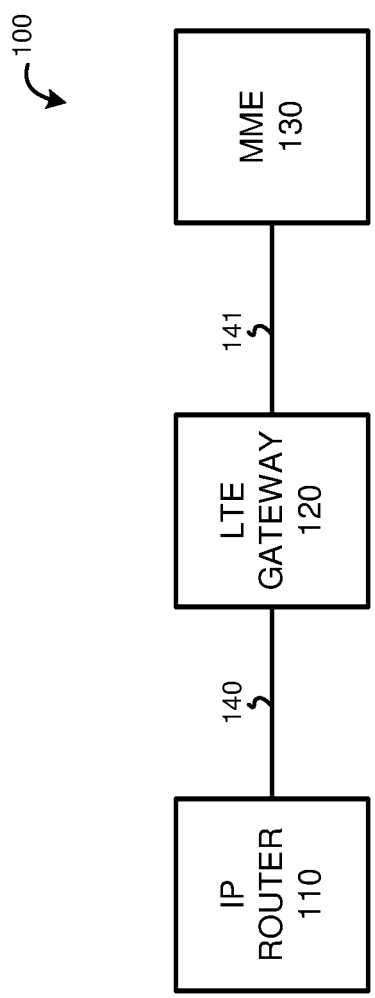
FIG. 1 illustrates a communication system to control wireless communication device traffic.

FIG. 1 illustrates a communication system 100 to control wireless communication device traffic. Communication system 100 includes Internet Protocol (IP) router 110, Long Term Evolution (LTE) gateway 120, and mobility management entity (MME) 130. IP router 110 communicates with LTE gateway 120 over communication link 140, and LTE gateway 120 further communicates with MME 130 over communication link 141.

IP router 110 comprises one or more computing devices capable of forwarding data packets over an IP network. LTE gateway 120 may comprise a packet data network gateway (P-GW), a serving gateway (S-GW), or another similar gateway in an LTE network. MME 130 comprises one or more computing devices in an LTE network responsible for the bearer activation in wireless communication devices and is also responsible for choosing the S-GW for a communicating wireless communication device.

In operation, one or more wireless access nodes, such as eNodeBs in LTE networks, connect wireless communication devices to the packet networks, such as the Internet. To make the communications, LTE networks include various LTE gateways and routers to connect the wireless communication devices to the requested content or service that the end user desires. Further, the routers and gateways may include rule and policy enforcement, which can be used to direct or shed communicating devices based on the communication type or the state of the network.

Figure 2:
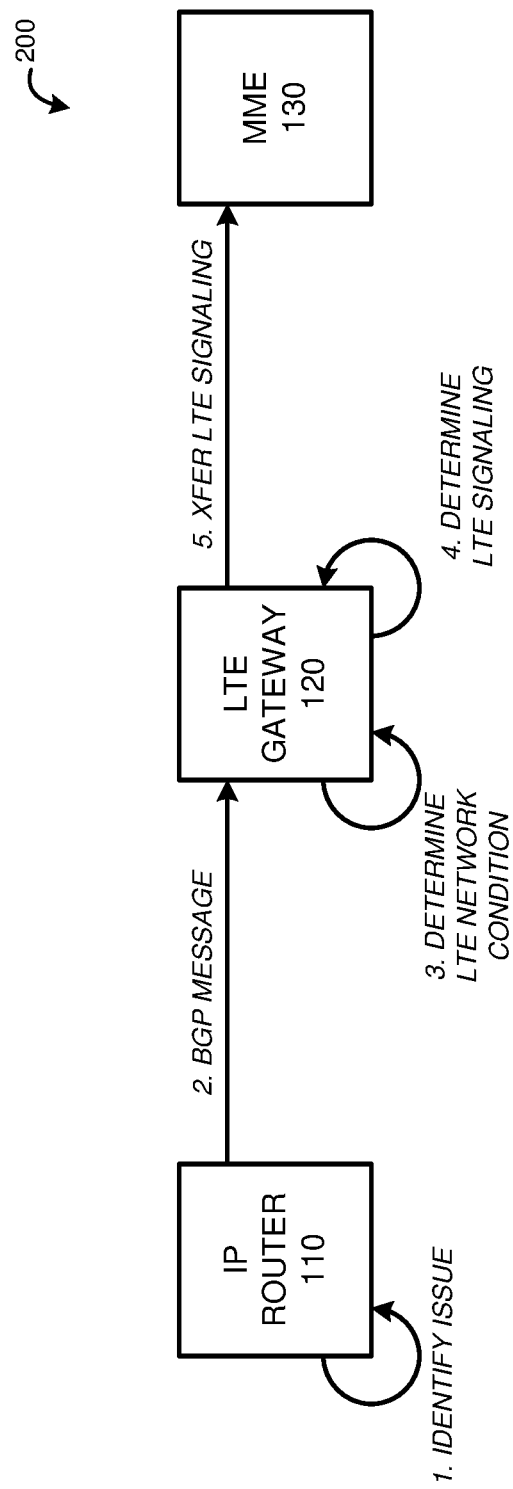
FIG. 2 illustrates an operational scenario of operating a communication network to control wireless communication device traffic.

FIG. 2 illustrates an operational scenario 200 of operating communication network 100 to control wireless communication device traffic. As illustrated in FIG. 2, IP router 110 identifies a communication issue or lack of connectivity between IP router 110 and an external network or device. Responsive to identifying the issue, IP router 110 transfers a Border Gateway Protocol (BGP) message to LTE gateway 120 indicating that an issue exists for a certain IP route. Once the BGP message is received by LTE gateway 120, LTE gateway 120 determines an LTE network condition. This LTE network condition determination may include a determination of the service that has the issue, such as Voice over Long Term Evolution (VoLTE) or the Internet.

Further, once the network condition is identified, LTE gateway 120 determines LTE signaling that can be transferred to MME 130. In some examples, the LTE signaling comprises instructions for the MME to shed or stop incoming communications based on the service that has an issue. For example, if IP router 110 identified that a range of IP addresses were no longer available for the internet, LTE gateway 120 may transfer LTE signaling that prevents future devices from connecting to the internet using the LTE gateway.

Figure 3:
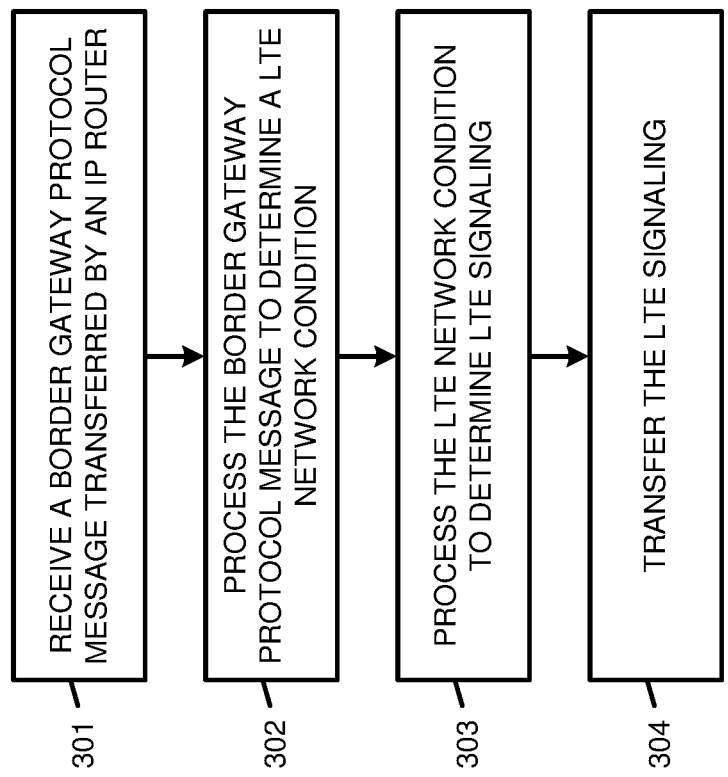
FIG. 3 illustrates a method of operating a Long Term Evolution gateway to control wireless communication device traffic.

FIG. 3 illustrates a method of operating an LTE gateway to control wireless communication device traffic. The LTE gateway may comprise a P-GW in some examples, although other gateways may be used to control the wireless communication device traffic. As illustrated in FIG. 3, the LTE gateway receives a BGP message transferred by an IP router (301). In some examples, the IP router may comprise a tier one router that has access to the entire internet region routing table through peering relationships. Thus, the tier one router can be used with other tier one internet service providers that are joined in the peering relationship.

Once the BGP message is received, the LTE gateway processes the BGP message to determine an LTE network condition (302). In some examples, the network condition may comprise a complete loss of connection between the gateway and the internet. In other examples, the BGP message may indicate that the router is progressively losing connections to various IP addresses, which may indicate a future failure or other issue with the connection to the outside network. Once the network condition is determined, the LTE gateway processes the network condition to determine LTE signaling, wherein the LTE signaling indicates an MME instruction representing an MME action and an LTE service (303). Upon determination of the LTE signaling, the LTE signaling is transferred to the MME to allow MME to implement the instructions (304). For example, if, based on the BGP message, the LTE gateway determines that there is a loss of connectivity between the IP router and the internet, the LTE gateway may transfer signaling to the MME to prevent all incoming communications and shed the current connections to the IP router.

In some examples, the MME action is based on the severity of the issue from the BGP message. For instance, a BGP message that indicates that the IP router is progressively losing small amounts of IP addresses may influence the LTE gateway to implement an MME instruction that sheds new incoming communications from wireless communication devices. Accordingly, rather than allowing devices to initiate a new communication using the same P-GW or S-GW, the MME may be used to either redirect or reject the communication from the wireless communication device. However, the devices that are already communicating using the LTE gateway path may continue the communication until it is complete.

In contrast, if the BGP message indicates that the IP router has a complete loss of connectivity to the internet or other service, the LTE gateway may implement an instruction that sheds all communications to the MME. As a result, the MME will prevent new communications from communicating over the LTE gateway and will further to shed the current communications that are already communicating over the network.

In some examples, the MME instruction and the LTE service includes instructions based on access point names (APNs), virtual routing and forwarding (VRF), the service itself, the quality of service class identifier (QCI), or any other similar access control managed wholly or partially by the MME. Accordingly, to control wireless communication traffic, the LTE gateway may limit communication access for devices by limiting the APNs, VRFs, and QCIs that are provided for the connecting devices. For example, if a device attempts to connect to an email server, the MME may shed or redirect the communication if the APN, QCI, or other access control in the LTE signaling indicates the communication should not continue across the current path.

Although illustrated in the previous examples using the internet as the service with the issue, it should be understood that the same principles may apply to VoLTE communications. For example, if an IP router identifies an issue in the communication path between the router and the IP multimedia subsystem (IMS), a BGP message may influence the LTE gateway to prevent or shed incoming VoLTE communications that communicate using that IP router.

Figure 4:
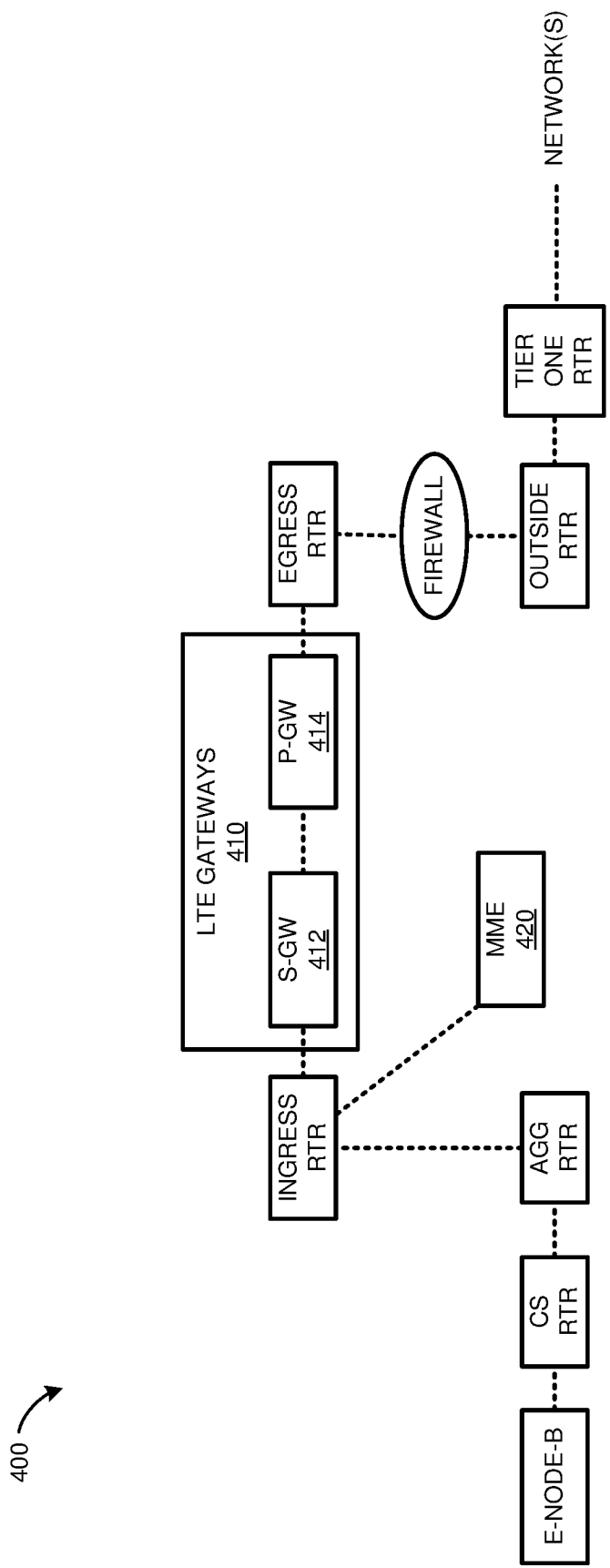
FIG. 4 illustrates a communication system to control wireless communication device traffic.

FIG. 4 illustrates a communication system 400 to control wireless communication device traffic. Communication system 400 shows the control links and omits the data links for clarity. Communication system 400 includes LTE gateways 410, which may be used in determining LTE signaling for the MME, and further includes MME 420. LTE gateways 410 include S-GW 412 and P-GW 414 in the present example, although other gateways may exist in some communication systems. Communication system 400 also includes a cell side router (CS RTR), an aggregation router (AGG RTR), an ingress router, an egress router, a firewall, an outside network router (OUTSIDE RTR), and a tier one router. These routers and firewalls are used to connect the LTE communications to IP based networks and devices. Further, the routers and firewalls are merely an example of routers and firewalls that may be included in an LTE network, and it should be understood that an LTE network may contain greater or fewer numbers of routers and firewalls in some examples.

In operation, a wireless communication device uses communication system 100 to access various content from communication networks. These communication networks may include IP networks, such as the internet or IMS based networks. LTE communications across communication system 100 may include voice communications, music or video communications, real-time gaming communications, or any other communication from the wireless communication device.

Figure 5:
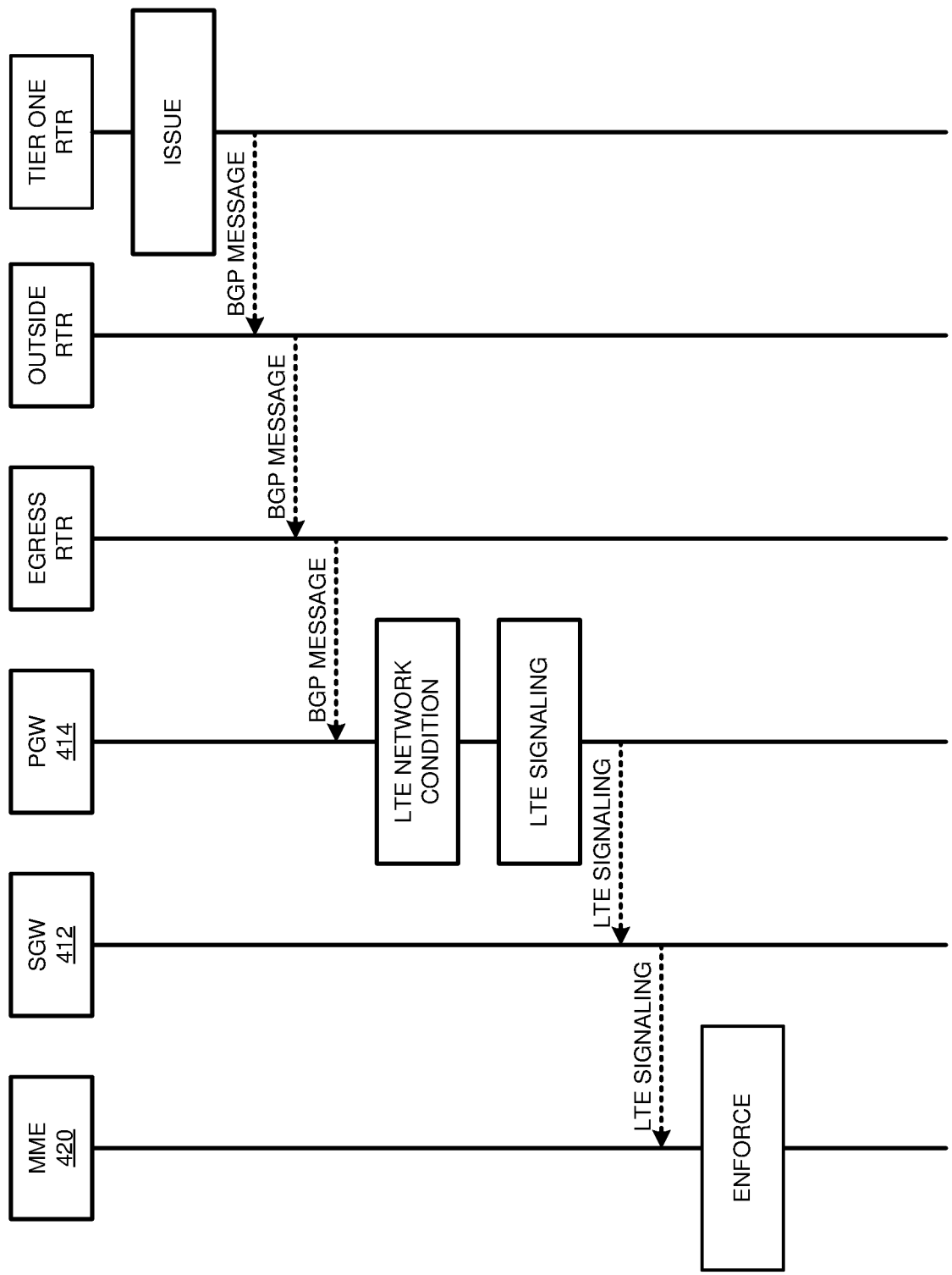
FIG. 5 illustrates a timing diagram to control wireless communication device traffic.

FIG. 5 illustrates a timing diagram to control wireless communication device traffic in wireless communication system 400. As depicted, the tier one router identifies an issue in connecting to the Internet. Responsive to detecting the issue, the tier one router communicates a BGP message to the outside router, which forwards the BGP message to the egress router. The egress router then transfers the BGP message to PGW 414. Although illustrated in the present example with two intermediary routers between the tier one router and PGW 414, it should be understood that any number of routers might be located between the tier one router and PGW 414.

Once PGW 414 receives the BGP message, PGW 414 determines an LTE network condition that is based on the BGP message. In some examples, the BGP message may include information about the IP addresses that are accessible using the tier one router. Accordingly, if IP addresses for a particular service are not available, then PGW 414 may determine that there is a network condition based on the service outage. In response to identifying the network condition, PGW 414 determines LTE for MME 420 based on the LTE network condition. Referring to the previous example, if PGW 414 determines that a service is unavailable, such as the internet, PGW 414 may determine an MME instruction and a service identifier to control the flow of communications for a wireless device. For instance, PGW 414 may direct MME 420 to shed or prohibit future internet access requests because the tier one router is unable to access the internet.

Figure 6:
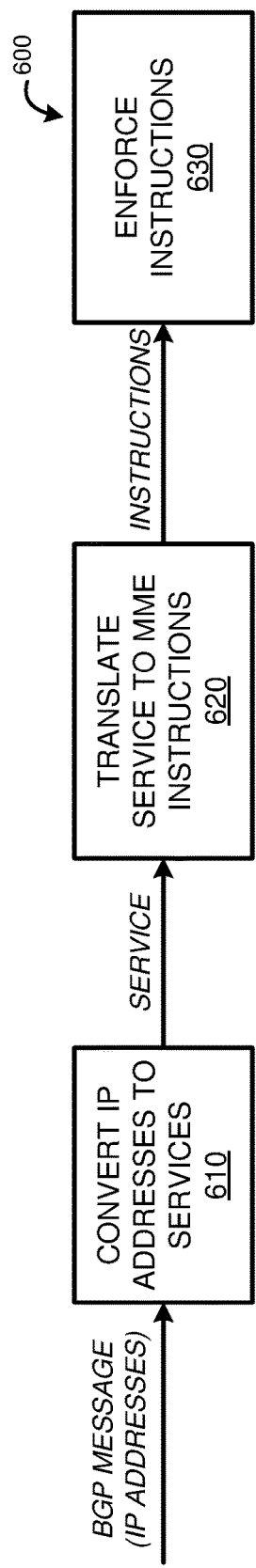
FIG. 6 illustrates a flow diagram to provide instructions to a mobility management entity.

FIG. 6 illustrates a flow diagram 600 to provide instructions to an MME. As illustrated, a BGP message is transferred from an IP router, such as a tier one router, for delivery to an LTE network gateway. Once the message is received, the LTE network gateway converts the IP addresses of the BGP message to determine the LTE network condition and the service related to the condition (610). In some examples, the BGP message may be related to a particular LTE service, such as the internet or VoLTE. Once the service is identified, the LTE network gateway may translate the service and the severity of the network condition into MME instructions to be delivered to the MME. For example, if the LTE network gateway identified in the BGP message that the internet was no longer accessible over the LTE gateway, the MME instructions might indicate to the MME that no new communications should be allowed using the internet and may further indicate that all current communications should be shed from the current communication path.

In contrast, if the network condition identified by the LTE gateway indicates that there is an issue with a smaller number of IP addresses, or indicates that there is a partial degradation in the number of IP addresses available for connections, then the MME instructions might indicate that only new connections should be shed from communication network. For example, the LTE gateway may identify that the service is degrading over time, and responsively prevent future users from accessing the network, while letting current wireless communication devices finish their communication.

Once the MME instructions are determined by the LTE gateway, the instructions are transferred to the MME to be enforced (630). In some examples, the instructions to the MME may include APNs, QCIs, or other similar service identifiers to assist the MME in determining the service that is suffering from the network condition. Accordingly, to enforce the instructions, the MME may be used to shed the appropriate connections associated with the APN, QCI, or other service identifier.

Figure 7:
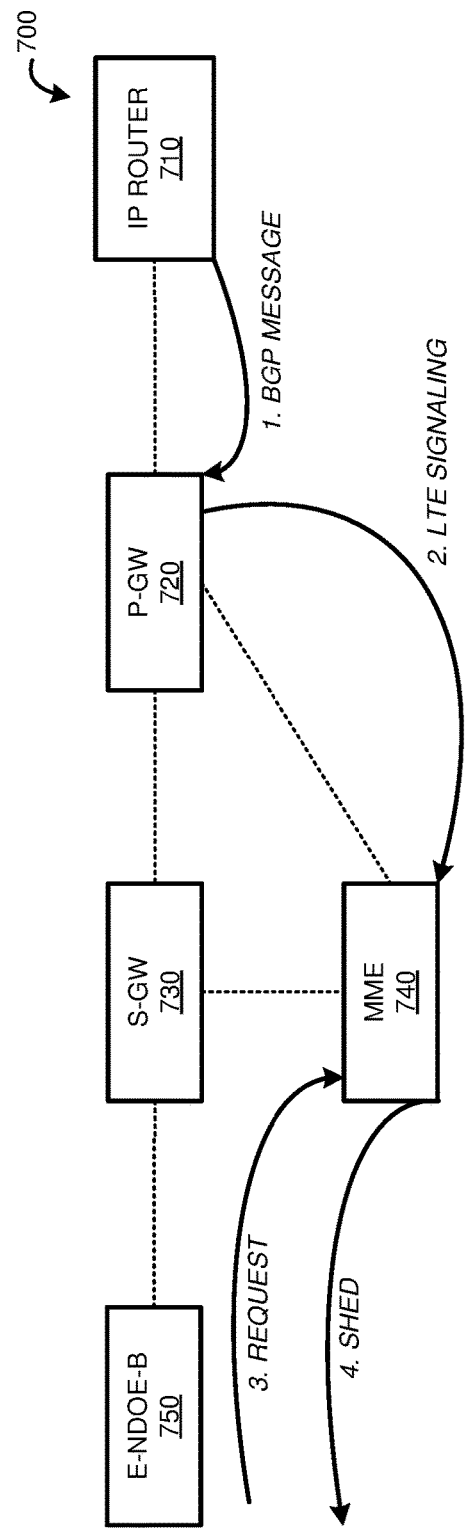
FIG. 7 illustrates an overview of operating a communication system to control wireless communication device traffic.

FIG. 7 illustrates an overview 700 of operating a communication system to control wireless communication device traffic. Overview 700 includes IP router 710, P-GW 720, S-GW 730, MME 740, and eNodeB 750. Overview 700 shows the control links and omits the data links for clarity.

As depicted, IP router 710 may identify an issue between the IP router and a connected network. Responsive to detecting the issue, IP router 710 transfers a BGP message for delivery to P-GW 720. Once received by P-GW 720, P-GW 720 uses the BGP message to identify an LTE network condition, such as the availability of the internet, VoLTE, or other LTE related service. This LTE network condition may then be translated by P-GW 720 to determine LTE signaling that can control the wireless communications. As illustrated in the present example, the LTE signaling includes MME instructions that are used to configure the MME based on the service issue. For example, IP router 710 may be used to connect wireless communication devices to other devices on the internet. As one or more IP addresses become unavailable, the BGP message transferred from IP router 710 to P-GW 720 may be translated into an LTE network condition, such as an Internet outage condition. This internet outage condition may then be translated into LTE signaling that includes MME instructions and a service identifier for the MME to change the handling of communications across the network.

In the example of FIG. 7, IP router 710 includes a BGP message that, when processed, indicates a partial degradation of connectivity for a service, such as Internet service. In response to the degradation, P-GW 720 determines LTE signaling to influence the operation of MME 740. As illustrated, because the service is degrading, the LTE signaling includes instructions to the MME to shed all new connections that attempt to communicate over the path that includes IP router 710. Thus, as a wireless communication device requests a communication over eNodeB 750, MME 740 will shed the communication to prevent the communication path from traversing IP router 710. However, the communications that have already been initiated along the path may continue the communication until completed or interrupted by the LTE condition.

In some examples, the LTE signaling may include APNs, QCIs, or other service identifiers that indicate the appropriate communications to be shed or prevented from communicating across particular LTE communication path. Further, although illustrated in the present example as only shedding new communication requests, it should be understood that the shedding is merely an example and the MME instructions may direct any of the connecting communications to be shed, rerouted, or otherwise modified.

Figure 8:
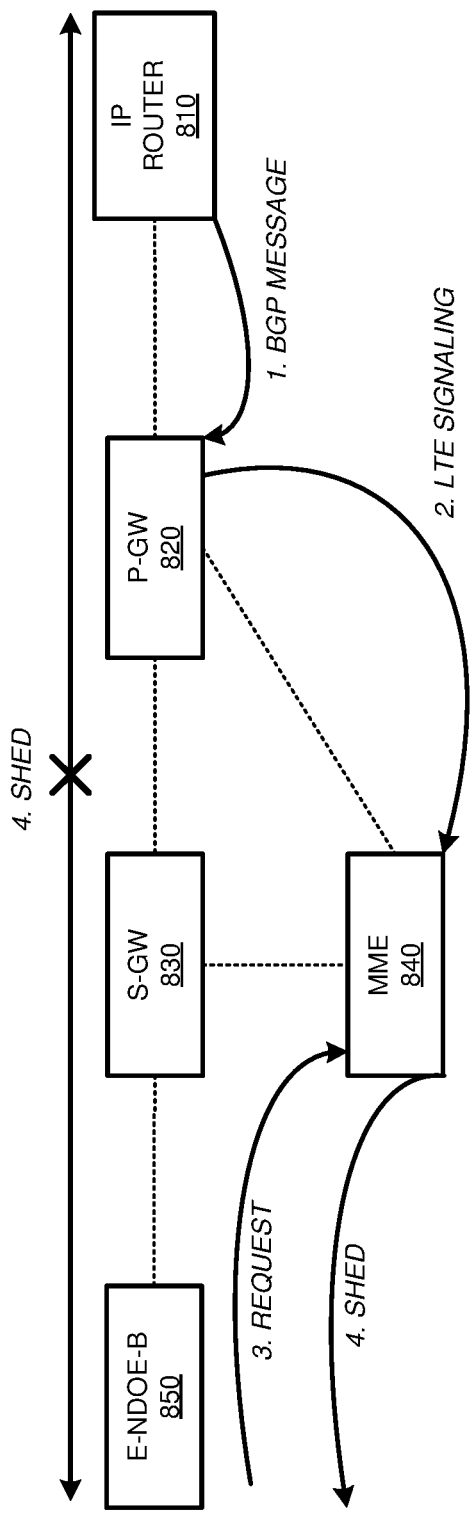
FIG. 8 illustrates an overview of operating a communication system to control wireless communication device traffic.

FIG. 8 illustrates an overview 800 of operating a communication system to control wireless communication device traffic. Overview 800 includes IP router 810, P-GW 820, S-GW 830, MME 840, and eNodeB 850. Overview 800 shows the control links and omits the data links for clarity.

Similar to the operation described in overview 700, IP router 810 may identify an issue between the IP router and a connected network. Responsive to detecting the issue, IP router 810 transfers a BGP message for delivery to P-GW 820. Once received by P-GW 820, P-GW 820 uses the BGP message to identify an LTE network condition, such as the availability of the internet, VoLTE, or other LTE related service. This LTE network condition may then be translated by P-GW 820 to determine LTE signaling that can control the wireless communications. As illustrated in the present example, the LTE signaling includes MME instructions that are used to configure the MME based on the service issue. For example, IP router 810 may be used to connect wireless communication devices to content and other data over the internet. As one or more IP addresses become unavailable, the BGP message transferred from IP router 810 to P-GW 820 may be translated into an LTE network condition, such as an internet outage condition. This internet outage condition may then be translated into LTE signaling that includes MME instructions and a service identifier for the MME to change the handling of communications across the network.

In the present example, IP router 810 transfers a BGP message that, when translated by P-GW 820, identifies a complete loss of a particular service. P-GW 820 then determines LTE signaling based on this complete loss of service, and transfers the LTE signaling to MME 840, including an instruction to shed all communications for the particular service that communicates across IP router 810. Accordingly, MME 840 may shed or redirect all communications related to the service over IP router 810 to prevent the communications from reaching the interrupted IP addresses.

In some examples, the LTE signaling may include APNs, QCIs, or other service identifiers that indicate the appropriate communications to be shed or prevented from communicating across particular LTE communication path. Additionally, P-GW 820 may also use the BGP message to direct S-GW 830 to no longer accept communications of that service type from eNodeB 850. Although illustrated in the present example as shedding communication requests, it should be understood that the shedding is merely an example and the MME instructions may direct any of the connecting communications to be shed, rerouted, or otherwise modified based on the service requested.

Figure 9:
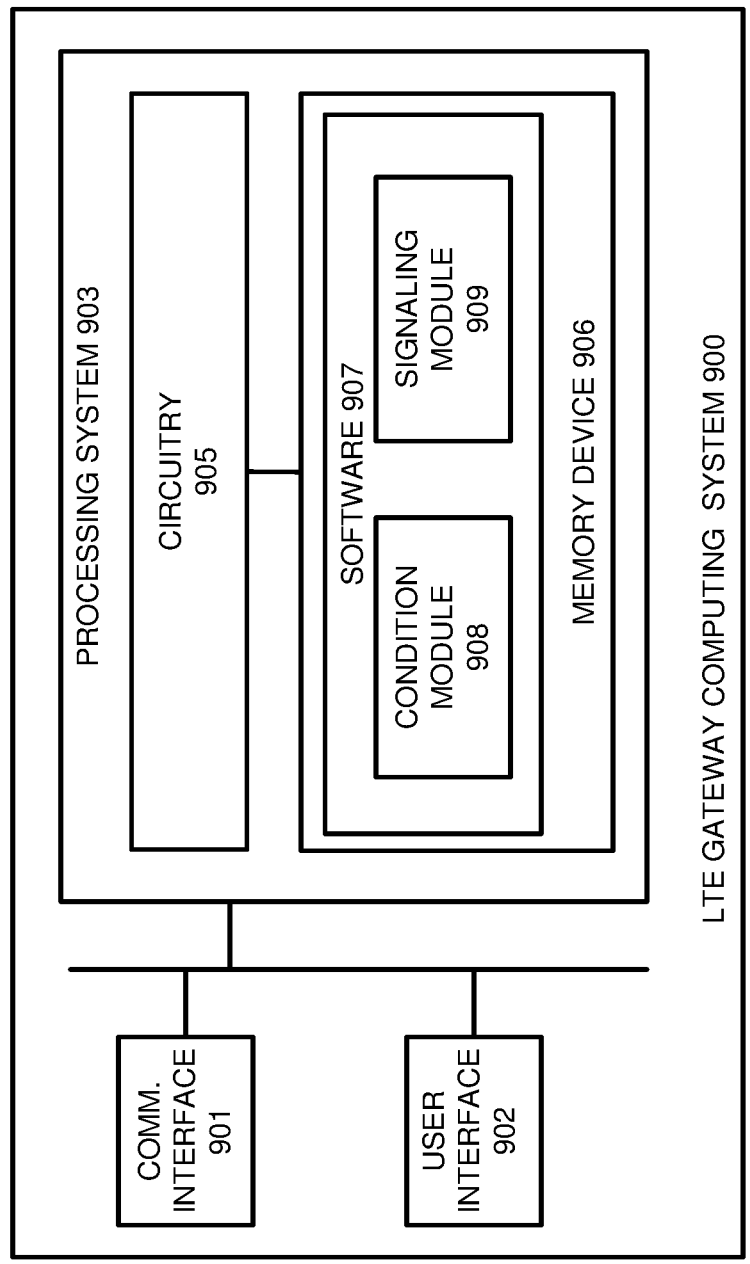
FIG. 9 illustrates a Long Term Evolution gateway computing system to control wireless communication device traffic.

FIG. 9 illustrates an LTE gateway computing system 900 to control wireless communication device traffic. LTE gateway computing system 900 is representative of a computing system that may be employed in any computing apparatus, system, or device, or collections thereof, to suitably implement the LTE gateways, S-GWs, or P-GWs described herein. Computing system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof. Communication interface 901 may be configured to communicate with other gateways and MMEs and may further be configured to receive BGP messages from one or more routers in a wireless communication system.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes condition module 908 and signaling module 909. Operating software 907 may further include an operating system, utilities, drivers, network interfaces, applications, or some other type of software. When executed by circuitry 905, operating software 907 directs processing system 903 to operate LTE gateway computing system 900 as described herein.

In particular, communication interface 901 is configured to receive BGP messages from one or more IP routers in a wireless communication system. These routers may be tier one routers in some examples or may be any other router used to transfer communications for wireless communication devices to the internet or other service. Responsive to the BGP messages, condition module 908 determines an LTE network condition based on the message. For instance, if the BGP message indicated that certain IP addresses were no longer available, computing system 900 may identify an internet outage or interruption condition.

Once the condition is identified, signaling module 909 determines LTE signaling to be transferred to a mobility management entity. This LTE signaling includes an MME instruction and a service identifier based on the network condition. For instance, if the network condition comprised a loss of VoLTE communication, then the LTE signaling may indicate to the MME to shed all communications associated with VoLTE. To accomplish this shedding, the instruction may include APNs, QCIs, or other similar service identifiers to notify the MME of the appropriate service to be acted on.

Although illustrated in the present example with two software modules, it should be understood that LTE gateway computing system 900 might include any number of software modules. Further, although described in the previous example transferring LTE signals to shed all communications, computing system 900 might include instructions to purge new connections, redirect communications, or any other instruction to control IP traffic from wireless communication devices.

Referring back to the elements of FIG. 1, IP router 110, LTE gateway 120, and MME 130 may each include communication interfaces, network interfaces, processing systems, computer systems, microprocessors, storage systems, storage media, or some other processing devices or software systems, and can be distributed among multiple devices.

Communication links 140-141 each use metal, glass, optical, air, space, or some other material as the transport media. Communication link 140 uses border gateway protocol to communicate information about the status of the LTE network from IP router 110 to LTE gateway 120. Communication link 141 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication link 140-141 may each be a direct link, or can include intermediate networks, systems, or devices, and can include a logical network link transported over multiple physical links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network comprising:

wireless base stations wirelessly exchanging voice or video data with User Equipment (UEs) for voice or video service and exchanging the voice or video data with wireless network gateways for the voice or video service;

the wireless network gateways exchanging the voice or video data with the wireless base stations for the voice or video service and exchanging the voice or video data with Internet Protocol (IP) routers for the voice or video service;

one of the wireless network gateways receiving a Border Control Protocol (BGP) message from one of the IP routers indicating a performance issue with an IP address, and in response, the one wireless gateway associating the IP address with the voice or video service and transferring wireless network signaling indicating a service issue for the voice or video service at the one wireless network gateway;

a management computer receiving the wireless network signaling and responsively transferring additional wireless network signaling to shed the one wireless network gateway for the voice or video service;

the wireless base stations receiving the additional network signaling, wirelessly exchanging additional voice or video data with the wireless UEs for the voice or video service, and responsive to the additional network signaling, exchanging the additional voice or video data with the wireless network gateways except for the one wireless network gateway having the service issue;

the wireless network gateways, except for the one wireless network gateway, exchanging the additional voice or video data with the wireless base stations for the voice or video service and exchanging the additional voice or video data for the voice or video service with the IP routers except for the one of the IP routers having the performance issue.

2. The method of claim 1 wherein the one of the IP routers comprises a Tier One IP router.

3. The method of claim 1 wherein the wireless network signaling identifies the voice or video service with an Access Point Name (APN).

4. The method of claim 1 wherein the wireless network signaling identifies the voice or video service with a Quality-of-service Class Identifier (QCI).

5. The method of claim 1 wherein the one wireless network gateway comprises a Packet Data Network Gateway (P-GW).

6. The method of claim 1 wherein the management computer comprises a Mobility Management Entity (MME).

7. The method of claim 1 wherein the wireless base stations comprise Node Bs.

8. A wireless communication network comprising:

wireless base stations configured to wirelessly exchange voice or video data with User Equipment (UEs) for voice or video service and to exchange the voice or video data with wireless network gateways for the voice or video service;

the wireless network gateways configured to exchange the voice or video data with the wireless base stations for the voice or video service and to exchange the voice or video data with Internet Protocol (IP) routers for the voice or video service;

one of the wireless network gateways configured to receive a Border Control Protocol (BGP) message from one of the IP routers indicating a performance issue with an IP address, and in response, to associate the IP address with the voice or video service and to transfer wireless network signaling indicating a service issue for the voice or video service at the one wireless network gateway;

a management computer configured to receive the wireless network signaling, and in response, to transfer additional wireless network signaling to shed the one wireless network gateway for the voice or video service;

the wireless base stations configured to receive the additional network signaling, to wirelessly exchange additional voice or video data with the wireless UEs for the voice or video service, and in response to the additional network signaling, to exchange the additional voice or video data with the wireless network gateways except for the one wireless network gateway having the service issue; and the wireless network gateways, except for the one wireless network gateway, configured to exchange the additional voice or video data with the wireless base stations for the voice or video service and to exchange the additional voice or video data for the voice or video service with the IP routers except for the one of the IP routers having the performance issue.

9. The wireless communication network of claim 8 wherein the one of the IP routers comprises a Tier One IP router.

10. The wireless communication network of claim 8 wherein the wireless network signaling identifies the voice or video service with an Access Point Name (APN).

11. The wireless communication network of claim 8 wherein the wireless network signaling identifies the voice or video service with a Quality-of-service Class Identifier (QCI).

12. The wireless communication network of claim 8 wherein the one wireless network gateway comprises a Packet Data Network Gateway (P-GW).

13. The wireless communication network of claim 8 wherein the management computer comprises a Mobility Management Entity (MME).

14. The wireless communication network of claim 8 wherein the wireless base stations comprise Node Bs.

* * * * *